United States Patent
Feng et al.

(10) Patent No.: US 9,436,735 B1
(45) Date of Patent: Sep. 6, 2016

(54) ACCESS PATH OPTIMIZATION THROUGH SYSTEM STATISTICS

(71) Applicant: International Business Machines Corporation, Armonk, NY (US)

(72) Inventors: Hao Feng, Beijing (CN); Shuo Li, Beijing (CN); ShengYan Sun, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/016,461

(22) Filed: Feb. 5, 2016

Related U.S. Application Data

(63) Continuation of application No. 14/798,537, filed on Jul. 14, 2015.

(51) Int. Cl.
*G06F 17/30* (2006.01)

(52) U.S. Cl.
CPC ............................... *G06F 17/30474* (2013.01)

(58) Field of Classification Search
CPC ............................................. G06F 17/30474
USPC ....... 707/706, 713, 718–722, 736, 758, 781, 707/999.004
See application file for complete search history.

(56) References Cited

U.S. PATENT DOCUMENTS

| | | |
|---|---|---|
| 8,645,356 B2 | 2/2014 | Bossman et al. |
| 8,762,367 B2 | 6/2014 | Burger et al. |
| 8,775,413 B2 | 7/2014 | Brown et al. |
| 2014/0214798 A1 | 7/2014 | Nica et al. |

OTHER PUBLICATIONS

Feng et al., "Access Path Optimization Through System Statistics", U.S. Appl. No. 14/798,537, filed Jul. 14, 2015, 31 pages.
Appendix P, List of IBM Patents or Patent Applications Treated as Related, 2 pages, dated May 5, 2016.

*Primary Examiner* — Syling Yen
(74) *Attorney, Agent, or Firm* — Christopher McLane; Daniel R. Simek

(57) ABSTRACT

In an approach for calculating one or more access paths during bind time, a computer receives a query. The computer identifies one or more access paths for processing the received query, wherein the one or more access paths include steps associated with retrieving data from a database based on the received query. The computer calculates resource costs associated with processing the received query on the one or more identified access paths based on one of more of: resources utilized to perform steps associated with processing the received query, and system statistics associated with the one or more identified access paths.

1 Claim, 3 Drawing Sheets

ACCESS PATH OPTIMIZATION THROUGH SYSTEM STATISTICS

BACKGROUND OF THE INVENTION

The present invention relates generally to the field of databases, and more particularly to evaluating multiple access paths for optimization.

Relational database management systems (RDBMS) manage relational databases that store data by organizing the data into predefined data categories in the form of related tables also known as relations. Relationships between tables in relational databases are identified through the use of primary and foreign keys. A primary key is a special relational database column, or combination of columns, designed to uniquely identify all table records. The foreign key, while also a column or group of columns in a relational database, references the primary key of another table thus providing a cross-reference link between the data in the tables. The remaining table structure includes columns, also referred to as fields, denoting one or more predefined data categories and rows, also referred to as a record that contains a unique instance of the data respective to the columns. As the relational database is a collection of data items organized as a set of formally-described tables, minimal assumptions are included regarding how the data is related, or how the data will be extracted from the database. Therefore, due to the minimal assumptions, the data in a relational database can be accessed or reassembled in many different ways without reorganizing the relational database tables in order to meet the specifications of a user.

The data within a relational database may be accessed by the user through queries (i.e., requests for information). In a relational database query, the query specifies both tables and conditions that link the tables. The query results are generated by accessing relevant data within the relational database and manipulating the data in a way that yields the requested information. To process the query, the data may be acquired by the relational database management system by accessing the relational database in different ways through different data structures and in different orders. Due to the variations, the time expended to process the query depends upon the selected query plan or access path. Query plans identify an ordered set of steps to access data in the relational database whereas an access path refers to the path (e.g., query plan) chosen by the system to retrieve the data after executing a structured query request.

Query optimizers attempt to determine the most efficient way to execute a given query by considering possible query plans. Due to the structure of a relational database, more than one query plan may be possible. Query optimizers form a set of query plans by examining the possible access paths (e.g., primary index access, secondary index access, full file scan) and various relational table join techniques (e.g., merge join, hash join, product join) that may be employed to access the data requested by the query. Cost-based query optimizers evaluate the resource footprint for the set of query plans and utilize the cost assessment as the basis for plan selection. The cost is a number that represents the estimated resource usage for a query plan. Query optimizers determine the cost of query plans by using a mathematical model of query execution costs that rely on estimates of the cardinality or number of tuples (e.g., number of elements of the set) flowing through each edge in a query plan. Query optimizers utilize the costs to estimate a runtime cost of evaluating the query in terms of the number of I/O operations required, CPU path length, amount of disk buffer space, disk storage service time, and interconnect usage between units of parallelism, and other factors determined from the data dictionary. The query optimizer then selects the query plan with the lowest associated cost to utilize to acquire the data requested by the query.

SUMMARY

Aspects of the present invention disclose a method, computer program product, and system for calculating one or more access paths during bind time. The method includes one or more computer processors receiving a query. The method further includes one or more computer processors identifying one or more access paths for processing the received query, wherein the one or more access paths include steps associated with retrieving data from a database based on the received query. The method further includes one or more computer processors calculating resource costs associated with processing the received query on the one or more identified access paths based on one of more of: resources utilized to perform steps associated with processing the received query, and system statistics associated with the one or more identified access paths.

DETAILED DESCRIPTION

Query optimization identifies and selects the most efficient access path in order to process a given query in minimum time. As recognized by embodiments of this invention, processing times of the same query through different access paths can include variances anywhere from a fraction of a second to hours depending on the selected access path. Embodiments of the present invention also recognize that system resource usage may vary during the bind time (e.g., time associated with the preparation to execute a query), which may change the costs associated with the access paths. Embodiments of the present invention monitor system resource usage for changes during the bind time and determine system resource usage weight changes. Embodiment of the present invention incorporate the system resource usage weight changes to recalculate the costs of the access paths and select the most effective access path for execution based on the recalculated costs.

Figure 1:
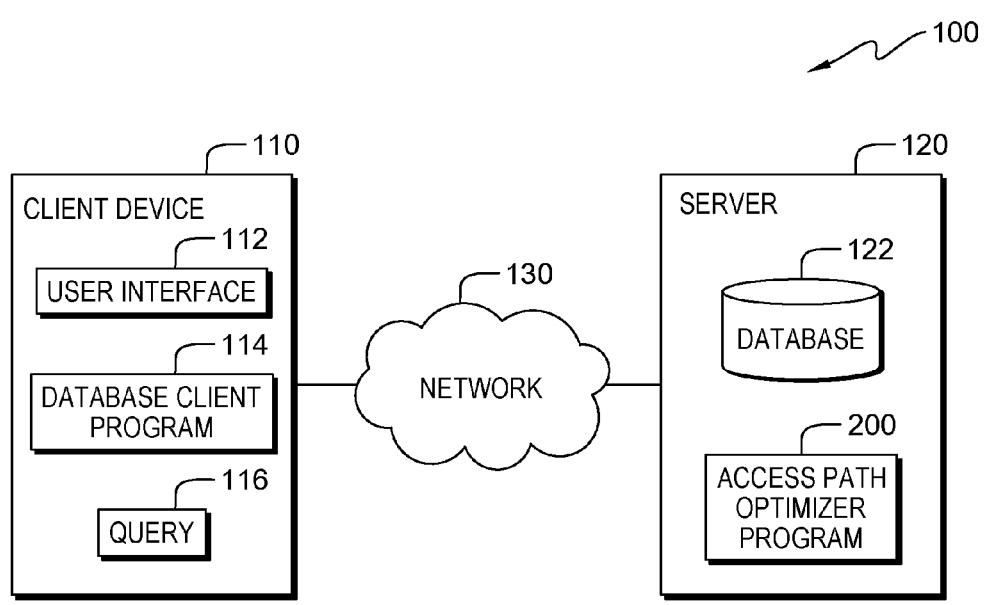
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes client device 110 and server 120 interconnected over network 130. Distributed data processing environment 100 may include additional computing devices, mobile computing devices, servers, computers, storage devices, or other devices not shown.

Client device 110 may be a web server or any other electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In other embodiments, client device 110 may represent a server computing system utilizing multiple computers as a server system, such as in a cloud computing environment. In general, client device 110 is representative of any electronic device or combination of electronic devices capable of executing machine readable program instructions, in accordance with embodiments of the present invention. Client device 110 contains user interface 112, database client program 114, and query 116.

User interface 112 is a program that provides an interface between a user of client device 110 and a plurality of applications that reside on client device 110 (e.g., database client program 114) and/or may be accessed over network 130. A user interface, such as user interface 112, refers to the information (e.g., graphic, text, sound) that a program presents to a user, and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information through database client program 114 to database 122 and access path optimizer program 200.

Database client program 114 is a software program for creating and managing information stored in database 122, such as within fields, records, and files (e.g., database management system). Database client program 114 is capable of storing, modifying, extracting, and searching for information within database 122. A user, through database client program 114, creates query 116 in order to extract and search for information within database 122. Database client program 114 sends query 116 to access path optimizer program 200 and database 122 for which results are returned. In the depicted embodiment, database client program 114 resides on client device 110. In another embodiment, database client program 114 may reside on server 120. In some other embodiment, database client program 114 may reside on another server or computing device (not shown) connected over network 130 provided database client program 114 has access to query 116 and database 122 and is accessible by access path optimizer program 200.

Query 116 is a user request for information from database 122 that when performed on database 122 returns results matching the specified criteria. Query 116 includes requests for information structured by a predefined format created by a user through database client program 114 that access path optimizer program 200 then utilizes to determine access paths. In one embodiment, query 116 may be a select query for data retrieval. In another embodiment, query 116 may be an action query that includes additional operations to perform on the data, such as insertion, updates, or deletions. In the depicted embodiment, query 116 resides on client device 110. In another embodiment, query 116 may reside on server 120. In some other embodiment, query 116 may reside on another server or computing device (not shown) connected over network 130 provided query 116 is accessible by database client program 114 and access path optimizer program 200 and has access to database 122.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. In general, server 120 is representative of any electronic device or combination of electronic devices capable of executing machine readable program instructions as described in greater detail with regard to FIG. 3, in accordance with embodiments of the present invention. Server 120 contains database 122 and access path optimizer program 200.

Database 122 is an organized collection of data. The data within database 122 is organized to model aspects of reality in a manner that supports processes requiring information, allowing database 122 to be accessed, managed, and updated. For example, the data may be organized into one or more tables of rows and columns with a unique key for each row. Database 122 may be a relational database (e.g., tabular database) in which the data is defined in a manner that allows the data to be reorganized and accessed in a number of different manners without reorganizing the database tables. Access to the data within database 122 is provided by a data management system, such as database client program 114, that consists of an integrated set of computer software that performs the user request (e.g., query 116), allowing interactions with one or more databases and providing access to all of the data contained in database 122.

Access path optimizer program 200 is a program that evaluates multiple access paths associated with executing query 116 (e.g., access paths associated with retrieving data from database 122) during bind time in order to select the lowest cost access path upon entering runtime. Access path optimizer program 200 monitors the resource usage of the system for changes during bind time and determines weight changes for the system resource usage. Access path optimizer program 200 updates the costs associated with the multiple access paths and selects the lowest cost access path at runtime. In the depicted embodiment, access path optimizer program 200 resides on server 120. In another embodiment, access path optimizer program 200 may reside on client device 110. In some other embodiment, access path optimizer program 200 may reside on another server or computing device (not shown) connected over network 130 provided access path optimizer program 200 has access to query 116 and database 122 and is accessible by database client program 114.

Network 130 may be a local area network (LAN), a wide area network (WAN), such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Figure 2:
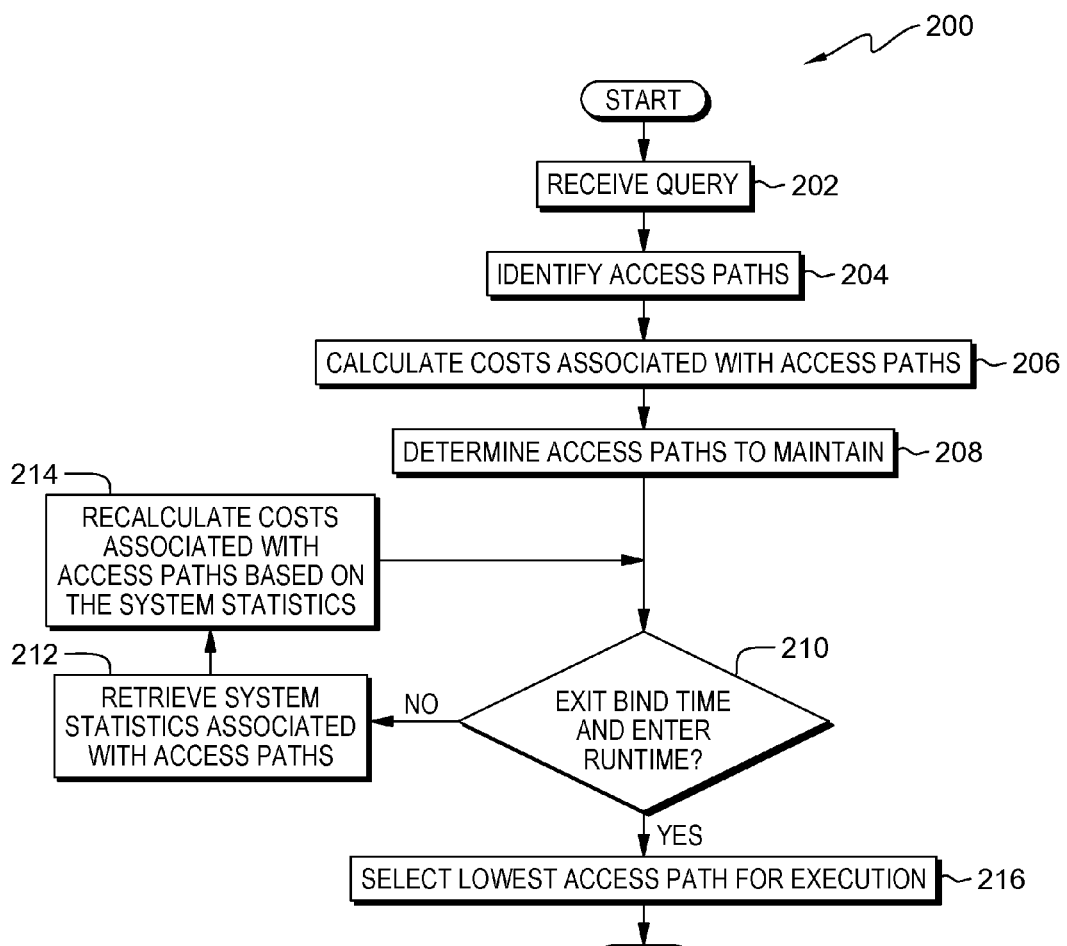
FIG. 2 is a flowchart depicting operational steps of an access path optimizer program, on a server computer within the data processing environment of FIG. 1, for evaluating the access paths to execute a query for optimization, in accordance with an embodiment of the present invention.

FIG. 2 is a flowchart depicting operational steps of access path optimizer program 200, a program for evaluating the access paths to execute query 116 for optimization, in accordance with an embodiment of the present invention. Prior to the initiation of access path optimizer program 200, data should reside within database 122 (e.g., tables within database 122 are populated with information). In one embodiment, access path optimizer program 200 is incorporated within a database program, such as database client program 114. In another embodiment, access path optimizer program 200 is incorporated as part of an existing query optimizer. In some other embodiment, access path optimizer program 200 may be a stand-alone query optimization program.

In step 202, access path optimizer program 200 receives query 116 from database client program 114. The user of client device 110 utilizes user interface 112 and database client program 114 to create query 116. For example, a user creates query 116 that specifies fields and values either through menu selection, by example, through a blank record, or through a special query language request. Through user interface 112 and database client program 114, the user of client device 110 selects to perform query 116. Upon receipt of the selection to perform query 116, database client program 114 sends query 116 to access path optimizer program 200. Access path optimizer program 200 initiates in response to receiving query 116.

In step 204, access path optimizer program 200 identifies access paths. With a relational database query, such as query 116, multiple access paths (e.g., alternatives) to execute query 116 may exist that achieve the same result but yield varying degrees of performance. For example, when providing directions to a destination, more than one route or set of directions may exist and be provided to reach the destination however, one route may take less time to reach the destination than another route. The access paths are query plans (e.g., ordered set of steps to access data in database 122 based on associated computer resources and resource usage) that identify recommended steps to execute query 116 in order to retrieve and/or prepare data within database 122. In one embodiment, access path optimizer program 200 identifies a predefined number of access paths (e.g., a default setting specifying the maximum number of access paths to monitor). In another embodiment, access path optimizer program 200 identifies a specific number of access paths as identified by a user through user interface 112. Access path optimizer program 200 identifies the specified number of access paths during bind time. Bind time references the time spent preparing to execute query 116. During bind time, access path optimizer program 200 establishes a relationship with database 122 and validates query 116 in order to detect and correct potential errors.

In one embodiment during bind time, access path optimizer program 200 may produce modified source code and a database request model (DBRM) when query 116 is embedded within application logic. Access path optimizer program 200 compiles the code for execution and binds the DBRM (e.g., includes all the statements from query 116 as runtime application program interface calls) to a package that encapsulates related procedures, functions, and associated cursors and variables together as a unit in database 122 for execution. In another embodiment, access path optimizer program 200 utilizes query 116 without creating a modified source code and a DBRM.

In some other embodiment, access path optimizer program 200 may parse query 116 into logical operations that represent the high level steps that will be performed in order to execute query 116. For example, query 116 includes reading data from a specified table and performing an inner join. Access path optimizer program 200 breaks query 116 into two pieces; one to read the data from the specified table, and the second to perform the inner join. Access path optimizer program 200 determines one or more access paths to execute query 116 (e.g., acquire the results) by combining the pieces of query 116 in various manners. For example, access path optimizer program 200 considers the indexes and size of the tables associated with the pieces of query 116 that are to be accessed and decides which of the indexes and tables are available to access, the method to utilize to access database 122, and the order in which to access the pieces of query 116 to obtain the data.

Access path optimizer program 200 identifies access paths based on the steps and or compiled code associated with performing query 116 based on cost and system resource usage information. Cost and system resource usage information may include central processing unit (CPU) & input/output (I/O) costs, buffer pool usage, record identifier (RID) usage, and work file usage. A buffer pool, or buffer cache, is system memory that caches tables and index data pages when modifications or reads from database 122 occur, allowing faster data retrieval. Record identifier usage is based upon the RID pool, an area within local storage reserved for RID sort processing, created at startup but not allocated until RID storage is needed. Work file usage utilizes data sets for: sorting, materializing views and nested table expressions, temporary tables, and temporary space assigned to continue RID list processing when the RID pool is not large enough and/or when the data page usage is high.

For example, access path optimizer program 200 factors in the system resources (e.g., I/O, CPU, and memory), number of rows to be returned, and size of the initial data sets to build the access paths. Access path optimizer program 200 may merge, reorganize, and process the steps of query 116 in any order to identify additional access paths (e.g., identifies access paths that may result in lower costs). In another embodiment, access path optimizer program 200 determines access paths based on user definitions (e.g., user specifies access paths or cost and system resource usage information specifications).

In step 206, access path optimizer program 200 calculates the cost associated with the access paths. Cost algorithms estimate the total cost (e.g., estimated resource usage) that executing query 116 will take by evaluating the steps of query 116. Access path optimizer program 200 calculates the CPU cost and I/O cost associated with the steps of the access paths. Access path optimizer program 200 calculates the CPU cost by applying statistics and a filter factor based on the statistics to the base cost, page cost, scan cost, and row cost associated with query 116. Access path optimizer program 200 calculated the I/O cost based on statistics and the filter factor. Access path optimizer program 200 calculates an overall total cost for each of the access paths by multiplying calculated CPU cost and the I/O cost by resource usage weights and combining the results. For example, total cost=CPU Cost*weight+I/O Cost*weight.

In addition to the CPU and I/O costs, access path optimizer program 200 evaluates one or more additional factors that may impact the overall cost associated with query 116.

Additional factors that may impact the cost include buffer pool usage, RID usage, and work file usage. Access path optimizer program 200 evaluates the additional factors and incorporates additional changes to the total cost. Access path optimizer program 200 evaluates the percentage of buffer pool usage allocated to executing query 116. Access path optimizer program 200 determines whether the size of the buffer pool allocated may be reduced during runtime, which results in a reduction of the amount of time spent monitoring and adjusting the buffer pool. For example, when statistically the threshold of a buffer pool is not met, the size of the buffer pool may be reduced.

Access path optimizer program 200 evaluates the RID usage and may cache the record identifiers in an order that reduces the time to evaluate query 116. For example, access path optimizer program 200 determines shared threads within query 116. Access path optimizer program 200 retrieves a list of record identifiers through a table scan and sorts the record identifiers in ascending order by page number. Access path optimizer program 200 may then plan a prefetch of the pages in the listed order to improve the estimated runtime. Prefetch is a technique that access path optimizer program 200 employs to speed up the execution of query 116 by reducing the wait states (e.g., delay experienced by client device 110 when accessing external memory, such as database 122).

Additionally, access path optimizer program 200 evaluates the work file usage for high data page use conditions. Access path optimizer program 200 may offload data pages to the buffer pool when the buffer pool is not maximized. By offloading the data pages to the buffer pool, access path optimizer program 200 improves the overall runtime cost. Access path optimizer program 200 stores the cost in memory for each of the access paths separately for future use.

In step 208, access path optimizer program 200 determines the access paths to maintain. Access path optimizer program 200 evaluates the access paths with respect to predefined criteria (e.g., lowest overall cost, exceeds threshold, conflicts with a defined rule). In one embodiment, access path optimizer program 200 may maintain all the access paths based on the evaluation of the predefined criteria. For example, access path optimizer program 200 maintains the five lowest overall costs and identifies only four access paths. Access path optimizer program 200 orders the access paths based on the separately stored costs from lowest to highest cost. Therefore, as access path optimizer program 200 identifies only four access paths, access path optimizer program 200 maintains the four access paths for further evaluations.

In another embodiment, access path optimizer program 200 may maintain a subset of the access paths (e.g., eliminates some access paths based on not meeting the predefined criteria). For example, access path optimizer program 200 evaluates the buffer pool usage which exceeds the threshold. Access path optimizer program 200 determines the buffer pool is not large enough to share between multiple users and eliminates the associated access path. In a similar example, again access path optimizer program 200 determines the buffer pool threshold is not large enough to share between multiple users; however, another access path exists that could be utilized instead of implementing a table scan, and access path optimizer program 200 again eliminates the access path associated with the buffer pool.

In decision 210, access path optimizer program 200 determines whether database client program 114 exits bind time and enters runtime. Runtime refers to the time execution query 116 occurs (e.g., exits bind time as preparations to execute query 116 are complete and retrieves data from database 122). Access path optimizer program 200 determines whether actions that occur during bind time are complete, and whether query 116 is ready to execute utilizing the lowest cost access path. For example, access path optimizer program 200 completes preparation of the statements to perform query 116 (e.g., no other additional statements remain to prepare), identifies the specified number of access paths (e.g., five of five access paths identified), and a connection to database 122 is present. Access path optimizer program 200 executes query 116 and enters runtime, thus performing the steps (e.g., instructions) associated with query 116. If access path optimizer program 200 determines database client program 114 enters runtime (decision 210, yes branch), then access path optimizer program 200 selects the lowest cost access path for execution (step 216). If access path optimizer program 200 determines database client program 114 does not enter runtime (decision 210, no branch), then access path optimizer program 200 retrieves the system statistics associated with the access paths (step 212).

In step 212, access path optimizer program 200 retrieves the system statistics associated with the access paths (e.g., gathers system statistics on the resources identified within the maintained access paths). Access path optimizer program 200 utilizes system statistics to improve the selection of the most efficient access path. System statistics (also known as workload statistics) are a form of dynamic metadata that includes information about operating resource consumption of database 122 (e.g., CPU usage, read/write time of the disks) that may change the resource usage weights. Access path optimizer program 200 may also gather fixed object statistics that provide performance information (e.g., workload) on the tables and respective indexes within database 122. Access path optimizer program 200 may retrieve short-period statistics, long period statistics, and/or real-time statistics with respect to the system statistics and fixed object statistics for the access paths. Short-period statistics are based on data that access path optimizer program 200 collects over a short time duration (e.g., thirty seconds, one minute, low percentage of the overall bind time, etc.). Long-period statistics are based on data that access path optimizer program 200 collects over a longer time duration (e.g., a day, weekly, cumulative number over multiple queries, high percentage of the overall bind time). Real-time statistics are based on data that access path optimizer program 200 receives immediately after collection.

In one embodiment, access path optimizer program 200 may receive system statistics based on one or more types of statistics (e.g., short-period, long-period, and/or real-time) based on predefined settings associated with the various components associated with the cost information. For example, access path optimizer program 200 utilizes long-period statistics to measure record identifier usage (e.g., how often a record identifier may be accessed) and/or to determine peak and off peak workload times. Access path optimizer program 200 utilizes the historical data over the longer period in order to project anticipated future record identifier usage. Whereas access path optimizer program 200 utilizes real-time statistics to measure the CPU cost to determine current availability as the CPU cost changes due to resource availability. In another embodiment, access path optimizer program 200 may receive system statistics from one type of statistic based on an overall elapsed bind time. In some other embodiment, access path optimizer program 200 determines the type of statistic based on a combination of predefined settings and overall elapsed bind time.

In some other embodiment, access path optimizer program 200 may retrieve the system statistics on a time-based interval (e.g., retrieves system statistics that are calculated based on predefined settings and available when the time-based interval occurs) during bind time. For example, the system statistics include long-period statistics that are calculated every hour and real-time statistics. Access path optimizer program 200, however, retrieves system statistics every minute during the bind time. Therefore, access path optimizer program 200 retrieves updates to the real-time statistics every minute and retrieves the same system statistic for the long-period statistic until an hour passes and the long-period statistics are recalculated. By access path optimizer program 200 retrieving the system statistics on a time-based interval during bind time, access path optimizer program 200 retrieves resource usage changes that may impact the costs associated with the access paths while limiting the workload associated with system statistics collection that may increase the cost associated with the access paths. In some other embodiment, access path optimizer program 200 retrieves the most recent system statistics available at the completion of bind time regardless of the time-based interval (e.g., retrieves latest system statistics prior to entering runtime).

In step 214, access path optimizer program 200 recalculates the costs associated with the access paths based on the system statistics. During bind time, the system statistics may change, and access path optimizer program 200 may identify resource usage weight changes. For example, the CPU may incur an increase in the resource usage weight when additional processing tasks occur thus taxing the CPU processing capability. Conversely, I/O operations for other tasks may complete, freeing I/O resources thus reducing the resource usage weight. Based on the recalculated costs of the access paths utilizing the respective resource usage weight changes, access path optimizer program 200 may reorder the access paths to reflect the lowest cost access path for execution. For example, changes in the system statistics regarding resource usage may increase and/or decrease the costs associated with one or more of the multiple access paths. Therefore, a previously low-cost access path may increase in cost, and a higher cost access path may decrease in cost and become the lowest cost alternative, while other access paths may not incur a change. Access path optimizer program 200 utilizes the system statistics to update the cost calculations associated with the access paths that may impact the access path selected at runtime (e.g., may result in changes in the lowest cost access path as changes occur within the system statistics). After recalculating the costs of the access paths, access path optimizer program 200 separately stores the recalculated costs in memory. Access path optimizer program 200 then returns to decision 210 and determines whether database client program 114 exits bind time and enters runtime.

In step 216, access path optimizer program 200 selects the lowest cost access path from the multiple access paths for execution. Access path optimizer program 200 searches the separately stored costs associated with each access path and identifies the lowest cost access path. Access path optimizer program 200 sends database client program 114 the lowest cost access path associated with query 116. Access path optimizer program 200 completes upon entering runtime and sending the lowest cost access path to database client program 114. Upon receipt of the lowest cost access path, database client program 114 executes query 116 to acquire the data from database 122.

Figure 3:
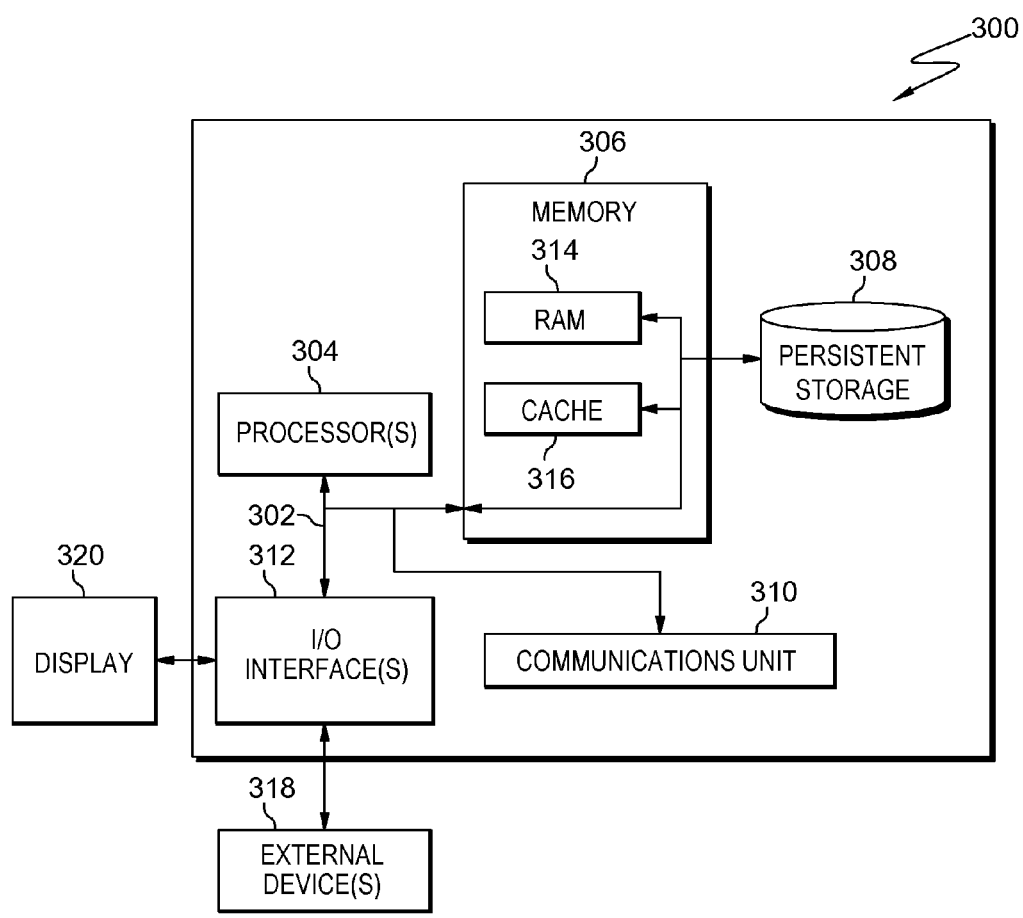
FIG. 3 is a block diagram of components of the server computer executing the access path optimizer program, in accordance with an embodiment of the present invention.

FIG. 3 depicts server computer 300 that is an example of a system that includes access path optimizer program 200. It should be appreciated that FIG. 3 provides only an illustration of one implementation and does not imply any limitations with regard to the environments in which different embodiments may be implemented. Many modifications to the depicted environment may be made.

Server computer 300 includes processor(s) 304, cache 316, memory 306, persistent storage 308, communications unit 310, input/output (I/O) interface(s) 312, and communications fabric 302. Communications fabric 302 provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of processor(s) 304 by holding recently accessed data, and data near recently accessed data, from memory 306.

Program instructions and data used to practice embodiments of the present invention may be stored in persistent storage 308 and in memory 306 for execution by one or more of the respective processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface(s) 312 may provide a connection to external device(s) 318, such as a keyboard, a keypad, a touch screen, and/or some other suitable input device. External device(s) 318 can also include portable computer readable storage media, such as, for example, thumb drives, portable optical or magnetic disks, and memory cards. Software and data used to practice embodiments of the present invention, e.g., user interface 112, database client program 114, query 116, database 122, and access path optimizer program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for calculating one or more access paths during bind time, the method comprising:
   receiving, by one or more computer processors, a query;
   identifying, by one or more computer processors, one or more access paths for processing the received query, wherein the one or more access paths include steps associated with retrieving data from a database based on the received query;
   calculating, by one or more computer processors, resource costs associated with processing the received query on the one or more identified access paths based on one or more of: resources utilized to perform steps associated with processing the received query, and system statistics associated with the one or more identified access paths,
   wherein the resource costs include: central processing unit (CPU) cost, input/output (I/O) costs, buffer pool usage, record identifier (RID) usage, and work file usage;
   determining, by one or more computer processors, whether the received query exits bind time, wherein the bind time includes preparation to execute the received query, establish a relationship with the database, and validate the received query to detect and correct potential errors;
   responsive to determining the received query does not exit bind time, retrieving system statistics associated with the one or more identified access paths based on one or more of: a time-based interval, short-period statistics, long-period statistics, and real-time statistics;
   identifying, by one or more computer processors, resource usage changes associated with the one or more identified access paths;
   determining, by one or more computer processors, resource usage weight changes associated with the identified resource usage changes;
   recalculating, by one or more computer processors, the resource costs associated with the one or more identified access paths based on the retrieved system statistics and the determined resource usage weight changes associated with the identified resource usage changes; and
   storing, by one or more computer processors, the recalculated resource costs associated with the one or more identified access paths during bind time.

* * * * *